(12) United States Patent
Luo et al.

(10) Patent No.: US 8,822,389 B2
(45) Date of Patent: Sep. 2, 2014

(54) DENDRITIC COMB-SHAPED POLYMER THICKENING AGENT, PREPARATON OF THE SAME AND APPLICATION THEREOF

(75) Inventors: Jianhui Luo, Beijing (CN); Huaijiang Zhu, Beijing (CN); Fengluan Bai, Beijing (CN); Pingmei Wang, Beijing (CN); Bin Ding, Beijing (CN); Jingbo Yang, Beijing (CN); Qiang Liu, Beijing (CN); Yuzhang Liu, Beijing (CN)

(73) Assignee: Petrochina Company Limited (CN)

( * ) Notice: Subject to any disclaimer, the term of this patent is extended or adjusted under 35 U.S.C. 154(b) by 149 days.

(21) Appl. No.: 13/508,866

(22) PCT Filed: Jun. 11, 2010

(86) PCT No.: PCT/CN2010/002421
§ 371 (c)(1),
(2), (4) Date: May 9, 2012

(87) PCT Pub. No.: WO2011/147054
PCT Pub. Date: Dec. 1, 2011

(65) Prior Publication Data
US 2013/0090269 A1    Apr. 11, 2013

(30) Foreign Application Priority Data
May 24, 2010  (CN) .......................... 2010 1 0189617

(51) Int. Cl.
*C09K 8/588*    (2006.01)
(52) U.S. Cl.
USPC ....................................... 507/225; 526/307.6
(58) Field of Classification Search
None
See application file for complete search history.

(56) References Cited

U.S. PATENT DOCUMENTS 7,304,116 B2    12/2007   Yuan et al.
2006/0287456 A1*  12/2006   Yuan et al. ................. 526/287

FOREIGN PATENT DOCUMENTS

| CN | 1414057 | 4/2003 |
|----|---------|--------|
| CN | 1876751 | 12/2006 |
| JP | 2006070020 | * 3/2006 |

OTHER PUBLICATIONS

International Search Report corresponding to PCT/CN2010/000835 dated Mar. 3, 2011.

* cited by examiner

*Primary Examiner* — Susannah Chung
*Assistant Examiner* — Kumar R Bhushan
(74) *Attorney, Agent, or Firm* — Locke Lord LLP; Alan B. Clement; Peter J. Fallon

(57) ABSTRACT

The present invention relates to a dendritic comb-shaped polymer thickening agent and preparation and application thereof; it is a copolymer obtained by copolymerization of monomer (A) and monomer (B). Monomer (A) is one or more water-soluble unsaturated monomers with olefin chain, and monomer (B) is at least one monomer with the following general structure:

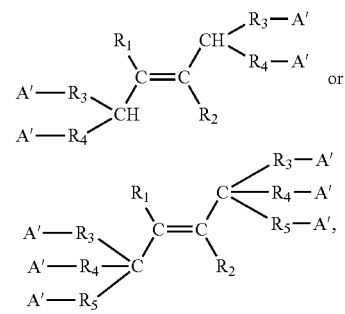

wherein $R_1$, $R_2$ is selected from H or $C_1$~$C_{12}$ alkyl group, respectively; $R_3$, $R_4$, $R_5$ is selected from H or $C_1$~$C_8$ alkyl group, $C_1$~$C_8$ alkylaryl group, $C_1$~$C_8$ alkyl ether or $C_1$~$C_8$ alkyl ester group, respectively; A' is selected from COO⁻ or OH. The content of the monomer (A) is 70~99.99% of the total mass of the monomer (A) and the monomer (B), and the content of monomer (B) is 0.01~30% of the total mass of the monomer (A) and the monomer (B). The viscosity of the polymer solution with the present polymer is 30% higher than that with common polyacrylamide and it is used in polymer flooding for oil reservoir with permeability lower than 400 mD in oilfields.

6 Claims, 1 Drawing Sheet

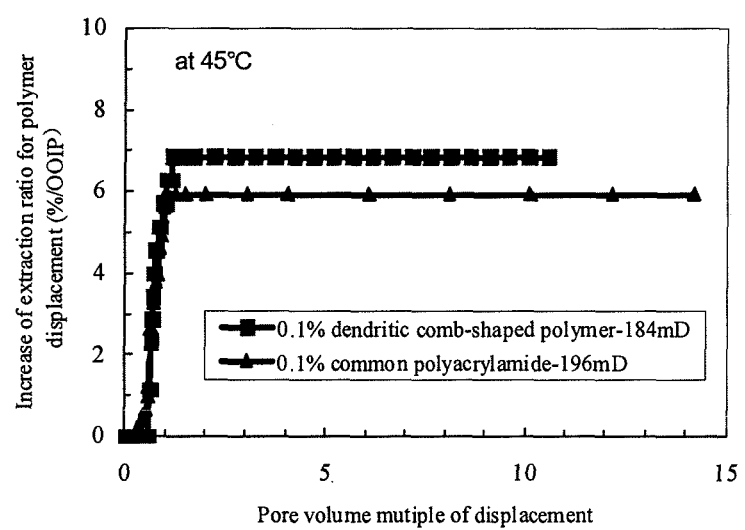

DENDRITIC COMB-SHAPED POLYMER THICKENING AGENT, PREPARATON OF THE SAME AND APPLICATION THEREOF

CROSS REFERENCES TO RELATED APPLICATIONS

This application is a National Stage patent application of International Patent Application Number, PCT/CN2010/000835, filed on Jun. 11, 2010, which claims priority to Chinese Patent Application No. 201010189617.4, filed on May 24, 2010.

TECHNICAL FIELD OF THE INVENTION

The invention relates to a dendritic comb-shaped polymer thickening agent, preparation of the same and application thereof.

BACKGROUND OF THE INVENTION

Polyacrylamide has poor salt-resistance and must be combined with freshwater so as to reach economic and relatively stable viscosity for the polymer solution. Therefore, solving the problem of salt-resistance for the polyacrylamide turns into one of the hot topics of the research in the field of oilfield chemistry over the world.

A comb-shaped salt-resistant polymer thickening agent described in Chinese invention patent (CN 011367989) has been largely applied for class I oil reservoirs in oilfields. This thickening agent can be directly combined with sewage, and the thickening performance thereof is increased by more than 50% as compared to that of polyacrylamide. This thickening agent has significant effect of increasing oil production as well as decreasing water cut, and thus becomes the new generation of oil displacement agents used in the tertiary oil recovery for class I oil reservoirs, which has a range of permeability in favor of polymer flooding, in oilfields. However, such industrial product of comb-shaped salt-resistant polymer has a lager molecular weight and a slower dissolving rate than polyacrylamide, and thus it will encounter some troubles in injection performance when applied for class II oil reservoirs, which has a permeability range lower than that of in class I oil reservoirs, in oilfields. It is an emphasis for further increasing the enhanced oil recovery of oilfields that the tertiary oil recovery in class II oil reservoirs in oilfields will become more important. Because the permeability of class II oil reservoirs is lower than that of class I oil reservoir in oilfields, it is necessary to utilize a new salt-resistant polymer that has relatively low molecular weight, good salt-resistance, and dissolving rate similar to that of polyacrylamide.

With regards to the requirement of the tertiary oil recovery for class II oil reservoir in oilfields, the comb-shaped salt-resistant polymer thickening agent has been improved and a braided comb-shaped salt-resistant polymer thickening agent has also been successfully developed, which is applied in U.S. patent (U.S. Pat. No. 7,304,116) and Chinese invention patent (CN 200510075291). This polymer has good salt-resistance with relatively low molecular weight, but, due to its lower dissolving rate in neutral water, the dissolving rate thereof could be similar to that of polyacrylamide only under certain base condition. Therefore, although the braided comb-shaped salt-resistant polymer thickening agent has good effect when used in combination flooding for class II oil reservoir in oilfields, it is still required to develop novel salt-resistant polymers used in polymer flooding for class II oil reservoir in oilfields.

SUMMARY OF THE INVENTION

The object of the present invention is to solve the problem of salt-resistance for polymers with relatively low molecular weight, and to provide a copolymer thickening agent that has lower molecular weight than comb-shaped salt-resistant polymer, good water-solubility, good thickening ability for aqueous medium and very good salt-resistance. This kind of polymer presents dendritic comb-shaped structure in aqueous solutions and is suitable to be used in polymer flooding for class II oil reservoir in oilfields. It can be quickly dissolved in produced water and the viscosity of the polymer solution is 30% higher or more than common polyacrylamide with similar molecular weight. Therefore, the economy benefit of the polymer flooding for class II oil reservoir can be increased, and the application field can be expanded.

The detailed contents of this invention are described as follows:

A dendritic comb-shaped polymer thickening agent, which is a copolymer obtained by copolymerization of monomer (A) and monomer (B), characterized in that monomer (A) is one or more water-soluble unsaturated monomers with olefin chain and may be one or more selected from the group consisting of acrylamide, vinyl pyrrolidone series, 2-Acrylamide-2-methyl propane sulfonic acid series and acrylic acid series, and monomer (B) is at least one monomer with the following general structure:

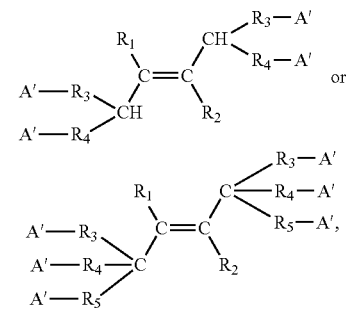

wherein $R_1$ and $R_2$ may be identical or different, and may be selected from H or $C_1$~$C_{12}$ alkyl group, respectively; $R_3$, $R_4$ and $R_5$ may be identical or different, and may be selected from H or $C_1$~$C_8$ alkyl group, $C_1$~$C_8$ alkylaryl group, $C_1$~$C_8$ alkyl ether or $C_1$~$C_8$ alkyl ester group, respectively; A' may be selected from COO⁻ or OH. The selection of $R_1$ and $R_2$ mainly effects the elasticity of the copolymer solution, and the elasticity of the copolymer solution increases along with the increasing of carbon number; the selection of $R_3$, $R_4$ and $R_5$ mainly effects the salt-resistance performance of the copolymer solution, and the salt-resisting ability of the copolymer solution increases along with the increasing of carbon number.

Monomer (B) is prepared as follows: 30~60% hydroxyl acid or polyalcohol is dissolved into ethanol, and then 6~12% of dihalogenated olefin is introduced; the solution is heated to reflux, and 40~50% caustic soda solution is dropwise introduced thereto so as to give neutral solution; the monomer (B) is obtained after removing ethanol and water by distillation. Said hydroxyl acid may be selected from the group consisting of hydroxyl pentanedioic acid, dihydroxyl maleic acid, mucic acid, malic acid, citric acid, tartronic acid and the like or the mixture of the above compounds. Said polyalcohol may be selected from the group consisting of glycerol, butantriol,- pentanetriol, hexanetriol, heptanetriol, octanetriol, pentaerythritol, butantetraol and the like or the mixture of the above compounds. Said dihalogenated olefin may be selected from the group consisting of dichloroethylene, dichloropropylene, dichlorobutylene, dibromoethylene, dibromopropylene, dibromobutylene and the like or the mixture of the above compounds.

The content of monomer (A) in the dendritic comb-shaped polymer thickening agent of the present invention is 70~99.99% by mass, preferably 90~99.9% by mass, of the total mass of monomer (A) and monomer (B), and the content of monomer (B) is 0.01~30% by mass, preferably 0.1~10% by mass, of the total mass of monomer (A) and monomer (B). In the polymerization system, the mass concentration of monomers is 10~50%, preferably 15~40%, of water by mass.

The initiator used for the dendritic comb-shaped polymer thickening agent of the present invention is any initiator that has been utilized in prior art, such as potassium persulfate; ammonium persulfate, sodium persulfate-potassium sulfite, ammonium persulfate-sodium hydrogensulfite, ammonium persulfate-rongalite, potassium persulfate-rongalite, azodiisobutyronitrile, ammonium persulfate-rongalite-azodiisobutyronitrile, ammonium persulfate-sodium hydrogensulfite-azodiisobutyronitrile, ammonium persulfate-rongalite-azodiisobutyronitrile.

The polymerization process used for the dendritic comb-shaped polymer thickening agent of the present invention is solution polymerization, emulsion polymerization or suspension polymerization process that has been utilized in prior art. The polymerization condition is described as follows: 0.15~0.2% of initiator is introduced after feeding nitrogen over 30 minutes for deoxygenation, and then the temperature is kept at 40~60° C. for 6~14 hours so as to give viscoelastic hydrogel product, which can be dried, if needed, by common means such as acetone precipitation, kneader, dryer and the like so as to give solid product.

BRIEF DESCRIPTION OF THE DRAWING

FIG. 1 compares the displacement efficiency of polymers in the class II oil reservoirs.

DETAILED DESCRIPTION OF THE INVENTION

In the following examples, each fractions and percentages are based on mass unless otherwise indicated.

The preparation of monomer (B):

EXAMPLE 1

30~60% hydroxyl acid or polyalcohol is dissolved into ethanol, and then 6~12% of dihalogenated olefin is introduced; the solution is heated to reflux, and 40~50% caustic soda solution is dropwise introduced thereto so as to give neutral solution; the monomer (B) of the present invention is thus obtained after removing ethanol and water by distillation.

The preparation of the dendritic comb-shaped polymer thickening agent:

EXAMPLE 2

To an aqueous solution containing 15% of acrylamide and 5% of monomer (B) that has a structure formula as

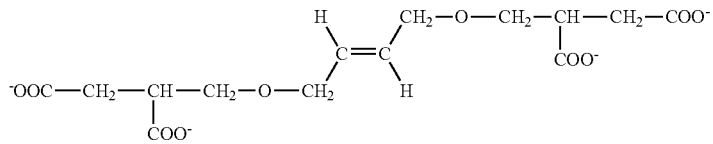

is added 0.2% of azodiisobutyronitrile as initiator after feeding nitrogen over 30 minutes for deoxygenation, and then the temperature is kept at 60° C. for 14 hours so as to give viscoelastic hydrogel product, which is dried on a kneader at 90° C. for 8 hours so as to give solid product.

EXAMPLE 3

To an aqueous solution containing 12% of acrylamide, 6% of acrylic acid and 2% of monomer (B) that has a structure formula as

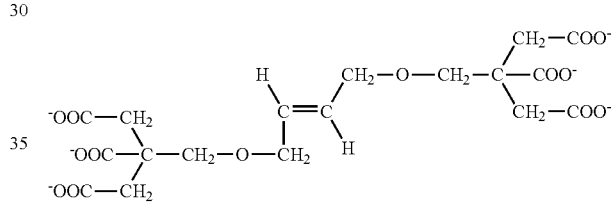

is added NaOH to adjust pH of the solution to 8. After feeding nitrogen over 30 minutes for deoxygenation, 0.1% of ammonium persulfate and 0.1% of rongalite are introduced to the solution, and the temperature is kept at 40° C. for 8 hours so as to give viscoelastic hydrogel product. The product is pelleted in a pellet mill and then dried on a rotary dryer at 90° C. for 3 hours so as to give solid product.

EXAMPLE 4

To an aqueous solution containing 7% of acrylamide, 10% of vinyl pyrrolidone and 3% of monomer (B) that has a structure formula as

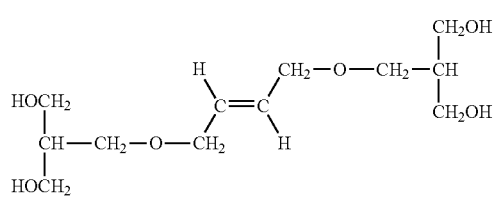

is added 0.15% of azodiisobutyronitrile as initiator after feeding nitrogen over 30 minutes for deoxygenation, and then the temperature is kept at 60° C. for 14 hours so as to give viscoelastic hydrogel product.

EXAMPLE 5

To an aqueous solution containing 15% of acrylamide, 8% of 2-Acrylamide-2-methyl propane sulfonic acid and 4% of monomer (B) that has a structure formula as

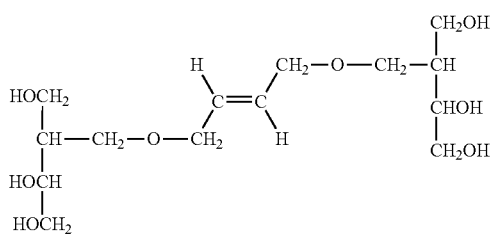

is added $Na_2CO_3$ to adjust pH of the solution to 9. After feeding nitrogen over 30 minutes for deoxygenation, 0.1% of ammonium persulfate and 0.1% of sodium hydrogensulfite are introduced to the solution, and the temperature is kept at 60° C. for 6 hours so as to give viscoelastic hydrogel product.

EXAMPLE 6

The performance of the solid product obtained in Example 3 are measured and compared with that of common polyacrylamide under the same condition. The measurements are shown in FIG. 1.

Industrial Applicability

From the measurements in FIG. 1, it can be seen that the dendritic comb-shaped polymer has a molecular weight similar to that of common polyacrylamide, and the aqueous solution with the present polymer has higher viscosity than that with common polyacrylamide, either in fresh water or sewage of Daqing oilfield. In particular, the viscosity of the aqueous solution obtained by dispersing the present polymer in sewage of Daqing oilfield is increased by 50% as compared to that for common polyacrylamide. The core test shown in FIG. 1 demonstrates that the displacement efficiency can be increased by 0.91% when using the dendritic comb-shaped polymer as compared to that obtained with common polyacrylamide under the same condition. It is shown that the dendritic comb-shaped polymer has relatively low molecular weight and good salt-resisting and thickening performance, and can meet the requirement of polymer flooding for class II oil reservoir in oilfields. It is also shown that the dendritic comb-shaped polymer is successfully designed on the molecular structure.

TABLE 1

Basic performance of the dendritic comb-shaped polymer

|  |  | Common polyacrylamide | Dendritic comb-shaped polymer |
|---|---|---|---|
| Solid content (%) | | 89.8 | 90.8 |
| Molecular weight ($10^4$) | | 1750 | 1710 |
| hydrolysis content (%) | | 25.1 | 24.7 |
| Viscosity of aqueous solution (mPa·s) | In fresh water of Daqing | 52.9 | 71.5 |
| | In sewage of Daqing | 26.8 | 40.2 |

Note:
The total salinity of freshwater of Daqing Oilfield is 1000 mg/L, wherein $Ca^{2+} + Mg^{2+}$ is 15 mg/L; and the total salinity of sewage of Daqing Oilfield is 4000 mg/L, wherein $Ca^{2+} + Mg^{2+}$ is 60 mg/L.

Monomer (B) of the present invention is characterized in that the unsaturated carbons are bonded to two side chains containing two ionic groups or polar groups, and the ionic groups or polar groups are located at the end of the side chains. Therefore, monomer (B) of the present invention is water-soluble, and can be homogeneously mixed with monomer (A) solution so that polymers with high molecular weight could be readily obtained by copolymerization and the obtained copolymer is able to be completely dissolved in aqueous medium. The preparation of monomer (B) is convenient: 30~60% hydroxyl acid or polyalcohol is dissolved into ethanol, and then 6~12% of dihalogenated olefin is introduced; the solution is heated to reflux, and 40~50% caustic soda solution is dropwise introduced thereto so as to give a neutral solution; the monomer (B) of the present invention is thus obtained after removing ethanol and water by distillation.

In a medium with the inorganic salt content of up to 30% and multivalent cation ($Ca^{2+}$, $Mg^{2+}$) content of up to 2%, the viscosity of aqueous medium with the dendritic comb-shaped polymer of the present invention can be increased at a temperature from room temperature to 90° C., and the retention rate of viscosity can keep quite high over relatively long period. The usage of thickening agent is 0.05~1% of the mass of aqueous medium to be injected.

Due to the technical solution of using the above mentioned monomer (A) and monomer (B) for copolymerization to give the dendritic comb-shaped polymer thickening agent, the polymer of the present invention presents very good water-solubility, and water-soluble dendritic comb-shaped polymer thickening agent with excellent salt-resisting performance is obtained.

The molecular weight of the dendritic comb-shaped polymer of the present invention is much lower than that of other comb-shaped salt-resistant polymer, and is capable to solve the problem of salt-resistance for polymers with relatively low molecular weight. Produced water may thus be utilized to combine with polymer for polymer flooding, and the viscosity of polymer solution is 30% higher than that for common polyacrylamide with similar molecular weight. Therefore, the dendritic comb-shaped polymer of the present invention can be used in polymer flooding for class II oil reservoir, which has permeability of lower than 400 mD, in oilfields, and thus can not only increase economy benefit of the polymer flooding for class II oil reservoir but also expand its application field. The dendritic comb-shaped polymer of the present invention can also be used in profile control and water shutoff in oilfields, and in flooding fluid diversion among deep Strata.

What is claimed is:

1. A dendritic comb-shaped polymer thickening agent, which is a copolymer obtained by copolymerization of monomer (A) and monomer (B), wherein the monomer (A) is one or more water-soluble unsaturated monomer with olefin chain, and the monomer (B) is at least one monomer with the following general structure:

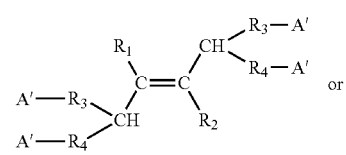

or

-continued

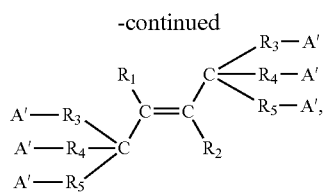

wherein $R_1$, $R_2$ is selected from H or $C_1$~$C_{12}$ alkyl group, respectively; $R_3$, $R_4$, $R_5$ is selected from H or $C_1$~$C_8$ bivalent alkyl group, $C_1$~$C_8$ bivalent alkylaryl group, $C_1$~$C_8$ bivalent alkyl ether or $C_1$~$C_8$ bivalent alkyl ester group, respectively, and when $R_3$, $R_4$, or $R_5$ is H, $R_3$, $R_4$, $R_5$ is not bonded to A'; A' is selected from $COO^-$ or OH; the content of the monomer (A) is 70~99.99% of the total mass of the monomer (A) and the monomer (B), and the content of monomer (B) is 0.01~30% of the total mass of the monomer (A) and the monomer (B).

2. The dendritic comb-shaped polymer thickening agent according to claim 1, wherein the monomer (A) is one or more of acrylamide, vinyl pyrrolidone series, 2-Acrylamide-2-methyl propane sulfonic acid series and acrylic acid series.

3. A process for preparing the dendritic comb-shaped polymer thickening agent according to claim 1, wherein said process comprises
   (1) dissolving 30~60% hydroxyl acid or polyalcohol in ethanol to provide a solition, intoducing 6~12% of dihalogenated olefin into the solution; heating the solution to reflux, and introducing a 40~50% caustic soda solution dropwise to the solution so as to provide a neutral solution; obtaining monomer (B) after removing ethanol and water by distillation;
   (2) the monomer (A) and monomer (B) are formulated according to the mass ratio of claim 1, and the mass concentration of monomer (A) and monomer (B) is 10~50% of water by mass; and
   (3) 0.15~0.2% of initiator is introduced after feeding nitrogen over 30 minutes for deoxygenation, and then the temperature was kept at 40~60° C. for 6~14 hours so as to give viscoelastic hydrogel product.

4. The process for preparing the dendritic comb-shaped polymer thickening agent according to claim 3, wherein the hydroxyl acid may be selected from the group consisting of hydroxyl pentanedioic acid, dihydroxyl maleic acid, mucic acid, malic acid, citric acid, tartronic acid and the like or the mixture of the above compounds; and the polyalcohol may be selected from the group consisting of glycerol, butantriol, pentanetriol, hexanetriol, heptanetriol, octanetriol, pentaerythritol, butantetraol and the like or the mixture of the above compounds.

5. The process for preparing the dendritic comb-shaped polymer thickening agent according to claim 3, wherein the dihalogenated olefin may be selected from the group consisting of dichloroethylene, dichloropropylene, dichlorobutylene, dibromoethylene, dibromopropylene, dibromobutylene or the mixture of the above compounds.

6. A process for polymer flooding for oil reservoir in an oilfield using the dendritic comb-shaped polymer thickening agent according to claim 1, said process comprises adding the thickening agent to an aqueous medium and injecting the medium in the oil reservoir having a permeability lower than 400 mD in oilfields, wherein the usage is 0.05~1% of the mass of aqueous medium to be injected.

* * * * *